Oct. 1, 1957    F. K. DAVIDSON    2,807,850
PLASTIC GROMMET
Filed Nov. 17, 1953
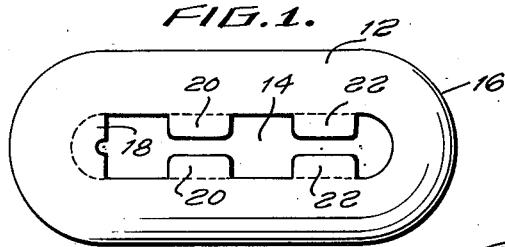
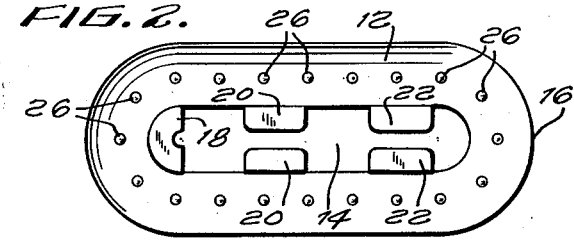
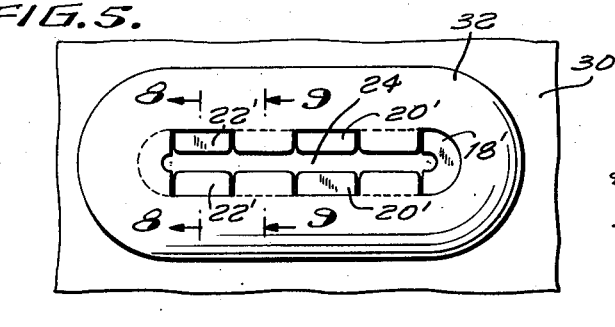
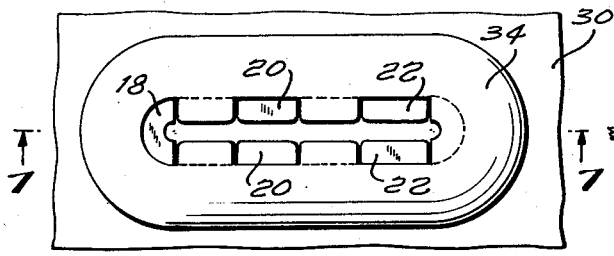
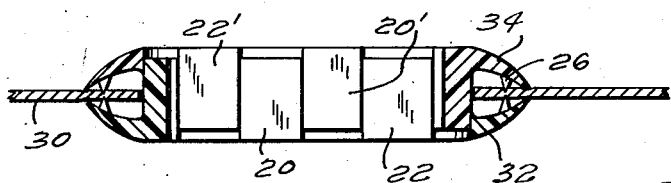
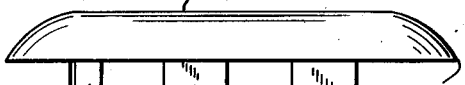
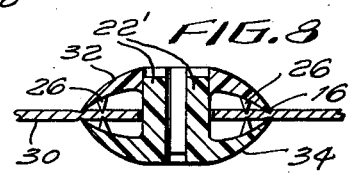
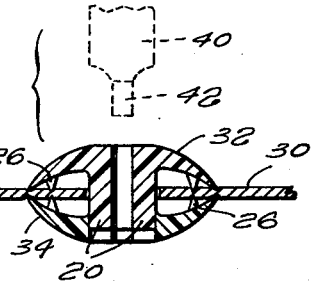
INVENTOR
FREDERICK K. DAVIDSON
BY James and Franklin
ATTORNEYS

United States Patent Office 2,807,850
Patented Oct. 1, 1957

2,807,850

PLASTIC GROMMET

Frederick K. Davidson, Boonton, N. J., assignor, by mesne assignments, to Boonton Molding Company, a limited partnership Application November 17, 1953, Serial No. 392,673

12 Claims. (Cl. 24—141)

This invention relates to grommets, and the primary object of the invention is to generally improve grommets.

There are numerous cases in which it is desirable to avoid the use of metal grommets. An important example are grommets used in clothing and which come in contact with the skin. Metal grommets feel cold to the touch. There is also the problem of corrosion resulting from perspiration, to counteract which it has heretofore been necessary to plate metal grommets with a non-corrosive plating. Other examples are grommets which may be exposed to an acid, or to an acid atmosphere, as in certain industrial plants.

To overcome these difficulties I have devised a grommet which is molded out of a suitable plastic, typically nylon. Such a grommet has low heat conductivity, and therefore may be used against the skin without a cold feeling. It is impervious to attack by many chemicals.

The grommet is preferably made in two halves which may be secured together on opposite sides of a sheet in order to reinforce an aperture or slit in the said sheet. In accordance with a further feature and object of the invention the grommet is so designed that both halves may be identical, with one half reversed in position relative to the other. This simplifies the manufacturing operations, and the subsequent handling and use of the parts of the grommet.

Still another object of the invention is to increase the holding ability of the grommet. For this purpose each half is made in the form of a hollow shell which is thickened at the center or near the aperture, and which tapers to a thin peripheral edge. Moreover, the hollowed inner face is provided with projecting points or nubs. When the halves of the grommet are secured together the sheet material is gripped by the thinned edges of the grommet which are pressed together with the sheet material therebetween, and additionally gripped by the nubs which also bear against the sheet material.

To accomplish the foregoing general objects, and other more specific objects which will hereinafter appear, the invention resides in the grommet elements, and their relation one to another, as are hereinafter more particularly described in the following specification. The specification is accompanied by a drawing, in which:

Fig. 1 is a plan view of a grommet half embodying features of my invention;

Fig. 2 is an inverted or bottom plan view of the grommet half shown in Fig. 1;

Fig. 3 is a side elevation of the grommet half;

Fig. 4 is an end elevation of the grommet half;

Fig. 5 is a plan view showing a complete grommet assembled with a fragment of the sheet material which is clamped therebetween;

Fig. 6 is a bottom plan view of the grommet and sheet assembly shown in Fig. 5;

Fig. 7 is a longitudinal section taken approximately in the plane of the line 7—7 of Fig. 6;

Fig. 8 is a transverse section taken approximately in the plane of the line 8—8 of Fig. 5; and Fig. 9 is a transverse section taken approximately in the plane of the line 9—9 of Fig. 5.

Referring to the drawing, and more particularly to Figs. 1–4, the grommet half there shown is molded out of a single body of plastic, in this case specifically nylon. It has a shell portion 12 which is open at the center 14. It is also raised and thickened at the center relative to the edge 16, as will be evident from inspection of the sectional views shown in Figs. 7, 8 and 9.

Reverting to Figs. 1–4 the grommet half has tenons 18, 20 and 22 molded integrally within the open center 14, and projecting toward the other half of the grommet. These are dimensioned to be received within the open center of the other half of the grommet, and the tenons are so located that the tenons of one half come between the tenons of the other. The assembly of tenons then defines an aperture of reduced size when the halves of the grommet are assembled. This aperture may be of any desired shape, for example round, but in the case here shown the aperture is an elongated narrow slit shown at 24 in Fig. 5.

The hollow shell portion 12 is preferably provided with a series of nubs 26. These are pointed, as is best shown in Figs. 7, 8 and 9. The parts are so dimensioned that when the halves of the grommet are squeezed together against a sheet of material, indicated at 30 in Figs. 5–9, the edge 16 of the grommet and the nub 26 of the grommet bear against and even bite into the sheet to help hold the same securely.

Referring now to Figs. 5 through 9 of the drawing, it may be explained that the two halves 32 and 34 of the grommet are preferably identical halves, one of which is reversed end for end relative to the other when the grommets are assembled. Thus reverting to Fig. 2 there are pairs of rectangular tenons 20 and 22 and a single semi-circular tenon 18. The space between the tenons 18 and the tenons 20 is such as to receive a pair of tenons like the tenons 22. The space between the tenons 20 and 22 is sufficient to receive therebetween a pair of tenons like the tenons 20. The semi-circular space outside the tenons 22 is dimensioned to receive a semi-circular tenon like the tenon 18. Thus by reversing one half grommet relative to the other, the two may be pushed together with the tenons received as shown in Figs. 5–9. In simplest design the parts are made symmetrical when assembled, as will be seen from inspection of Figs. 5 and 6, and therefore the parts of one half alone are off symmetry.

In Fig. 5 the upper ends of the tenons of the lower half of the grommet are shown at 22′, 20′ and 18′, while in the bottom view of Fig. 6 the ends of the grommets of the other half are shown at 18, 20 and 22. It will be evident from the drawing that the complete ring of tenons defines a narrow slit therewithin, and in the present case this is intended to receive a tape, specifically an elastic tape such as a garter.

To secure the halves of the grommet together they are preferably fused or welded with the sheet 30 gripped therebetween. The sheet may be made of any required material, and in one common example it is sheet rubber or latex. The halves of the grommet are preferably squeezed together and heated, as by means of a suitable tool schematically indicated in broken lines at 40. This preferably includes a guide strip 42 dimensioned to enter the slit 24 of the grommet. The part 40 may be made of a metal having good heat conductivity, typically copper, and is secured to an electrically heated member acting as a source of heat. During the welding operation the grommet, or at least the lower half of the same, may be supported in a suitable fixture or jig. It will be evident that the pressure of the tool 40 will serve to squeeze the halves of the grommet toward one another and to spring the thinned edges and the nubs tightly against the sheet material 30 at the same time that heat is applied. By making the supporting jig of metal, the parts may be cooled quickly when the heating tool is removed, and they adhere together permanently with the sheet material squeezed tightly therebetween.

In Figs. 7, 8 and 9 it will be seen that the tenons are slightly shortened, so that they do not come flush with the outside of the opposite half of the grommet. This is to make sure that the halves may be pressed or sprung together to obtain the desired grip on the sheet 30.

It is believed that the construction and method of assembly of my improved grommet, as well as the advantages thereof, will be apparent from the foregoing detailed description. It will also be apparent that while I have shown and described the invention in a preferred form, changes may be made in the structure shown without departing from the scope of the invention, as sought to be defined in the following claims.

I claim:

1. A plastic grommet to protectively reinforce sheet material at an aperture, said grommet being made of two halves each having a closed annular shell which is open and raised and thickened at the center relative to the edge, and each having a plurality of tenons molded integrally within the open center and projecting toward the other half of the grommet to be received within the open center of the other half, the said tenons being so located that the tenons of one half come between the tenons of the other, said tenons defining an aperture therewithin and acting as the tubular shank of the grommet when the halves are assembled, the parts being so dimensioned that when the halves of the grommet are pressed together through an aperture in a sheet the sheet is gripped by the periphery of the grommet.

2. A plastic grommet to protectively reinforce sheet material at an aperture, said grommet being made of two halves each having a closed annular shell which is open and raised and thickened at the center relative to the edge, and each having a plurality of tenons molded integrally within the open center and projecting toward the other half of the grommet to be received within the open center of the other half, the said tenons being so located that the tenons of one half come between the tenons of the other, said tenons defining an aperture therewithin and acting as the tubular shank of the grommet when the halves are assembled, the shell portion having a series of nubs projecting toward the other half of the grommet, the parts being so dimensioned that when the halves of the grommet are pressed together through an aperture in a sheet the sheet is gripped by the periphery of the grommet and by the nubs.

3. A plastic grommet to protectively reinforce sheet material at a slit, said grommet being made of two halves each having a generally elliptical closed shell which is open and raised and thickened at the center relative to the edge, and each having a plurality of tenons molded within the open center and projecting toward the other half of the grommet to be received within the open center of the other half, the said tenons being so located that the tenons of one half come between the tenons of the other, said tenons defining a slit therewithin and acting as the tubular shank of the grommet when the halves are assembled, the parts being so dimensioned that when the halves of the grommet are pressed together through a slit in a sheet the sheet is gripped by the periphery of the grommet.

4. A plastic grommet to protectively reinforce sheet material at a slit, said grommet being made of two halves each having a generally elliptical closed shell which is open and raised and thickened at the center relative to the edge, and each having a plurality of tenons molded integrally within the open center and projecting toward the other half of the grommet to be received within the open center of the other half, the said tenons being so located that the tenons of one half come between the tenons of the other, said tenons defining a slit therewithin and acting as the tubular shank of the grommet when the halves are assembled, the shell portion having a series of nubs projecting toward the other half of the grommet, the parts being so dimensioned that when the halves of the grommet are pressed together through a slit in a sheet the sheet is gripped by the periphery of the grommet and by the nubs.

5. A plastic grommet to protectively reinforce sheet material at a slit, said grommet being made of two identical halves reversed end for end and each having a generally elliptical shell which is open and raised and thickened at the center relative to the edge, and each having a plurality of tenons molded integrally within the open center and projecting toward the other half of the grommet to be received within the open center of the other half, the said tenons being so located that the tenons of one half come between the tenons of the other, said tenons defining a slit therewithin and acting as the tubular shank of the grommet when the halves are assembled, the parts being so dimensioned that when the halves of the grommet are pressed together through a slit in a sheet the sheet is gripped by the periphery of the grommet.

6. A plastic grommet to protectively reinforce sheet material at a slit, said grommet being made of two identical halves reversed end for end and each having a generally elliptical shell which is open and raised and thickened at the center relative to the edge, and each having a plurality of tenons molded integrally within the open center and projecting toward the other half of the grommet to be received within the open center of the other half, the said tenons being so located that the tenons of one half come between the tenons of the other, said tenons defining a slit therewithin and acting as the tubular shank of the grommet when the halves are assembled, the shell portion having a series of nubs projecting toward the other half of the grommet, the parts being so dimensioned that when the halves of the grommet are pressed together through a slit in a sheet the sheet is gripped by the periphery of the grommet and by the nubs.

7. The combination with a sheet having an aperture, of a plastic grommet to protectively reinforce the sheet at said aperture, the said grommet being made of two halves on opposite sides of the sheet, and each having a closed annular shell which is open and raised and thickened at the center relative to the edge, and each having a plurality of tenons molded integrally within the open center and projecting through the aperture toward the other half of the grommet and received within the open center of the other half, the said tenons being so located that the tenons of one half come between the tenons of the other, said tenons lining the aperture in the sheet, the tenons of one half being fused or welded to the other half to secure the halves together with the sheet therebetween, the parts being so dimensioned that the sheet is gripped by the periphery of the grommet.

8. The combination with a sheet having an aperture, of a plastic grommet to protectively reinforce the sheet at said aperture, the said grommet being made of two halves on opposite sides of the sheet, and each having a closed annular shell which is open and raised and thickened at the center relative to the edge, and each having a plurality of tenons molded integrally within the open center and projecting through the aperture toward the other half of the grommet and received within the open center of the other half, the said tenons being so located that the tenons of one half come between the tenons of the other, said tenons lining the aperture in the sheet, the shell portion having a series of nubs projecting toward the other half of the grommet, the tenons of one half being fused or welded to the other half to secure the halves together with the sheet therebetween, the parts being so dimensioned that the sheet is gripped by the periphery of the grommet and by the nubs.

9. The combination with a sheet having a slit, of a plastic grommet to protectively reinforce the sheet at said slit, the said grommet being made of two halves on opposite sides of the sheet, and each having a generally elliptical closed shell which is open and raised and thickened at the center relative to the edge, and each having a plurality of tenons molded integrally within the open center and projecting through the slit toward the other half of the grommet and received within the open center of the other half, the said tenons being so located that the tenons of one half come between the tenons of the other, said tenons lining the slit in the sheet, the tenons of one half being fused or welded to the other half to secure the halves together with the sheet therebetween, the parts being so dimensioned that the sheet is gripped by the periphery of the grommet.

10. The combination with a sheet having a slit, of a plastic grommet to protectively reinforce the sheet at said slit, the said grommet being made of two halves on opposite sides of the sheet, and each having a generally elliptical closed shell which is open and raised and thickened at the center relative to the edge, and each having a plurality of tenons molded integrally within the open center and projecting through the slit toward the other half of the grommet and received within the open center of the other half, the said tenons being so located that the tenons of one half come between the tenons of the other, said tenons lining the slit in the sheet, the shell portion having a series of nubs projecting toward the other half of the grommet, the tenons of one half being fused or welded to the other half to secure the halves together with the sheet therebetween, the parts being so dimensioned that the sheet is gripped by the periphery of the grommet and by the nubs.

11. The combination with a sheet having a slit, of a plastic grommet to protectively reinforce the sheet at said slit, the said grommet being made of two identical halves reversed end for end on opposite sides of the sheet, and each having a generally elliptical shell which is open and raised and thickened at the center relative to the edge, and each having a plurality of tenons molded integrally within the open center and projecting through the slit toward the other half of the grommet and received within the open center of the other half, the said tenons being so located that the tenons of one half come between the tenons of the other, said tenons lining the slit in the sheet, the tenons of one half being fused or welded to the other half to secure the halves together with the sheet therebetween, the parts being so dimensioned that the sheet is gripped by the periphery of the grommet.

12. The combination with a sheet having a slit, of a plastic grommet to protectively reinforce the sheet at said slit, the said grommet being made of two identical halves reversed end for end on opposite sides of the sheet, and each having a generally elliptical shell which is open and raised and thickened at the center relative to the edge, and each having a plurality of tenons molded integrally within the open center and projecting through the slit toward the other half of the grommet and received within the open center of the other half, the said tenons being so located that the tenons of one half come between the tenons of the other, said tenons lining the slit in the sheet, the shell portion having a series of nubs projecting toward the other half of the grommet, the tenons of one half being fused or welded to the other half to secure the halves together with the sheet therebetween, the parts being so dimensioned that the sheet is gripped by the periphery of the grommet and by the nubs.

References Cited in the file of this patent

UNITED STATES PATENTS

| | | |
|---|---|---|
| 607,315 | Wingard | July 12, 1898 |
| 624,150 | Andrus | May 2, 1899 |
| 697,344 | Leland | Apr. 8, 1902 |
| 2,125,060 | Barnes et al. | July 26, 1938 |
| 2,592,130 | Erb et al. | Apr. 8, 1952 |